US009718440B2

(12) United States Patent
Kim et al.

(10) Patent No.: US 9,718,440 B2
(45) Date of Patent: Aug. 1, 2017

(54) ELECTRONIC KEY DEVICE CAPABLE OF WIRELESSLY CONTROLLING LOCK SYSTEM AND TRANSMITTING CONTROL AUTHENTICATION OF LOCK SYSTEM, SYSTEM THEREFOR, AND METHOD THEREFOR

(71) Applicants: Gwang Woo Kim, Gyeongsan (KR); Kun Hwi Choi, Daegu (KR); Cheung Hui Choi, Daegu (KR)

(72) Inventors: Gwang Woo Kim, Gyeongsan (KR); Kun Hwi Choi, Daegu (KR); Cheung Hui Choi, Daegu (KR)

( * ) Notice: Subject to any disclaimer, the term of this patent is extended or adjusted under 35 U.S.C. 154(b) by 0 days.

(21) Appl. No.: 15/228,351

(22) PCT Filed: Feb. 3, 2015

(86) PCT No.: PCT/KR2015/001118
§ 371 (c)(1),
(2) Date: Aug. 4, 2016

(87) PCT Pub. No.: WO2015/119417
PCT Pub. Date: Aug. 13, 2015

(65) Prior Publication Data
US 2016/0368455 A1 Dec. 22, 2016

(30) Foreign Application Priority Data
Feb. 7, 2014 (KR) ........................ 10-2014-0014459

(51) Int. Cl.
*B60R 25/24* (2013.01)
*B60R 25/25* (2013.01)
(Continued)

(52) U.S. Cl.
CPC .............. *B60R 25/24* (2013.01); *B60R 25/23* (2013.01); *B60R 25/25* (2013.01); *G05B 15/02* (2013.01);
(Continued)

(58) Field of Classification Search
CPC ......... B60R 25/23–25/25; B60R 15/02; B60R 9/00563
(Continued)

(56) References Cited

U.S. PATENT DOCUMENTS 9,621,702 B2 * 4/2017 Shen .................... H04M 1/7253
2016/0360406 A1 * 12/2016 Shen .................... H04M 1/7253
2016/0368455 A1 * 12/2016 Kim ........................ B60R 25/25

FOREIGN PATENT DOCUMENTS

JP 2009102943 5/2009
KR 1020110064621 6/2011
(Continued)

OTHER PUBLICATIONS

International Search Report.

*Primary Examiner* — Allen T Cao
(74) *Attorney, Agent, or Firm* — STIP Law Group, LLC

(57) ABSTRACT

According to an electronic key device capable of wirelessly controlling a lock system and transmitting control authentication of a lock system, a system therefor, and a method therefor, which are presented in the present invention, an operation of the lock system is controlled by communicating with the lock system, and an electronic key can be simply transmitted and rented, at a long distance through a communication network, by communicating with another electronic key device and granting operation control authority of the lock system to the other electronic key device.

8 Claims, 8 Drawing Sheets

(51) Int. Cl.
*B60R 25/23* (2013.01)
*G05B 15/02* (2006.01)
*G07C 9/00* (2006.01)
*G06K 9/00* (2006.01)
*H04W 4/00* (2009.01)

(52) U.S. Cl.
CPC .... *G07C 9/00563* (2013.01); *B60R 2325/101* (2013.01); *B60R 2325/103* (2013.01); *B60R 2325/105* (2013.01); *G06K 9/00892* (2013.01); *H04W 4/008* (2013.01)

(58) Field of Classification Search
USPC .............................................. 340/5.61–5.63
See application file for complete search history.

(56) References Cited

FOREIGN PATENT DOCUMENTS

| KR | 1020120090148 | 8/2012 |
| KR | 1020120050080 | 11/2013 |

* cited by examiner

CREATE MOBILE PHONE-DEPENDENT ID BY COMBINING ONE
OR MORE OF SERIAL NUMBER OF INDIVIDUAL MODULE, MAC
ADDRESS OF LAN CARD, AND MODULE ID NUMBER

ELECTRONIC KEY DEVICE CAPABLE OF WIRELESSLY CONTROLLING LOCK SYSTEM AND TRANSMITTING CONTROL AUTHENTICATION OF LOCK SYSTEM, SYSTEM THEREFOR, AND METHOD THEREFOR

TECHNICAL FIELD

The present invention relates, in general, to an electronic key device and, more particularly, to an electronic key device, system, and method, which may wirelessly control a lock system and deliver permissions with which the lock system can be controlled.

BACKGROUND ART

Electronic keys communicate with a lock system installed in various mechanical devices for which user permission is required and serve to control the operation of the devices, such as locking or unlocking thereof, the start and end of operation thereof, and the like. Conventional electronic keys and lock systems using electronic communication therebetween are configured to carry a previously registered electronic key, thus requiring an additional portable device for the electronic key (refer to Korean Patent Application Publication No, 20-2004-0017110, Korean Patent Application Publication No. 10-2008-7017989, and the like).

Recently, in order to solve the problems of inconvenience in that an additional device must be carried, the method of adding an electronic key function to a mobile communication terminal has been developed (refer to Korean Patent Application Publication No. 10-2005-0095260). However, the recently developed electronic key device using a mobile communication terminal relates to a method for creating an electronic key merely by checking access permissions, and the created electronic key can be used only in the corresponding device within a fixed range. In other words, when an electronic key is lent in order to receive valet parking service or when it is necessary to urgently receive an electronic key at a remote place, there is inconvenience in that it is required to lend or deliver the corresponding mobile communication terminal in which the electronic key has been created.

Therefore, the present inventors intend to develop a new concept of electronic key device that may deliver different permissions with which a lock system can be controlled and allow economical installation by making the maximum use of the resources of common mobile phones.

DISCLOSURE

Technical Problem

The present invention is proposed in order to solve the above problems in the conventional methods, and an object of the present invention is to provide an electronic key device, system and method capable of wirelessly controlling a lock system and sending permissions with which the lock system can be controlled, which are configured such that the operation of the lock system is controlled by communicating therewith and such that the permissions with which the lock system can be controlled may be assigned to another electronic key device by communicating therewith, whereby the electronic key may be simply sent or lent over long distances through a communication network.

Also, another object of the present invention is to provide an electronic key device, system and method capable of wirelessly controlling a lock system and sending permissions with which the lock system can be controlled, in which economical installation is possible by using common smart devices, user authentication may be performed using a camera, a screen, a microphone, or the like, which is already installed in the smart devices, and problems attributable to the illegal use or duplication of an electronic key may be solved by creating the electronic key using an identification number dependent on each device.

A further object of the present invention is to provide an electronic key device, system and method capable of wirelessly controlling a lock system and sending permissions with which the lock system can be controlled, which are configured such that, using an electronic key application installed in a smart device, the operation of the lock system can be limited depending on one or more preset parameter values selected from among time, GPS coordinate values, temperature, and humidity, whereby the operation of the lock system may be limitedly controlled depending on the time, the region, the external environment, or the like, and different permissions may be assigned.

Technical Solution

In order to accomplish the above objects, an electronic key device capable of wirelessly controlling a lock system and sending permissions with which the lock system is to be controlled according to the features of the present invention may be configured to include a first communication module for communicating with the lock system; a second communication module for communicating with an additional electronic key device; and a control module which includes an electronic key creation unit for creating an electronic key corresponding to the lock system, a lock system control unit for registering the corresponding electronic key in the lock system through the first communication module and controlling the operation of the lock system by sending an operation control signal for the lock system, and a control permission transmission unit for assigning the permissions, with which the operation of the lock system is to be controlled, to the additional electronic key device through the second communication module.

Desirably, the first communication module may communicate with the lock system using one or more selected from among infrared rays, RFID, NFC, and Bluetooth, and the second communication module may communicate with the additional electronic key device using Wi-Fi or a mobile communication network.

Desirably, a user authentication module, for performing user authentication when controlling the operation of the lock system or when assigning the permissions, with which the operation of the lock system is to be controlled, to the additional electronic key device, may be further included, wherein the user authentication may be performed using one or more selected from among iris recognition, face recognition, fingerprint recognition, voice recognition, input of a password, and input of a pattern.

Desirably, the electronic key device may control the operation of the lock system depending on one or more preset parameter values selected from among time, GPS coordinate values, temperature, and humidity.

Desirably, the electronic key device may be a smart device in which an electronic key application for a vehicle is installed, and may be configured to wirelessly control the operation of a lock system installed in the vehicle and to assign permissions, with which the operation of the lock system is to be controlled, to another smart device.

In order to accomplish the above objects, an electronic key system capable of wirelessly controlling a lock system and sending permissions with which the lock system is to be controlled according to the features of the present invention includes a master key device for controlling operation of the lock system by communicating with the lock system and assigning permissions, with which the operation of the lock system is to be controlled, to an additional electronic key device by communicating with the additional electronic key device; and a slave key device for receiving the permissions, with which the operation of the lock system is to be controlled, from the master key device and controlling the operation of the lock system within a range of the received permissions, wherein each of the master key device and the slave key device may be a smart device in which an electronic key application is installed.

In order to accomplish the above objects, a method for wirelessly controlling a lock system and sending permissions with which the lock system is to be controlled using an electronic key according to the features of the present invention may be configured to include (1) creating, by a first smart device in which an electronic key application is installed, a master key corresponding to the lock system; (2) storing the master key, created at (1), in the first smart device and registering the master key in the lock system; (3) assigning permissions with which the operation of the lock system is to be controlled to a second smart device in such a way that the first smart device, in which the master key is stored, creates a slave key for controlling the operation of the lock system within a preset range and sends the slave key to the second smart device in which the electronic key application is installed; and (4) sending, by the first smart device or the second smart device, an operation control signal to the lock system and thereby controlling the operation of the lock system.

Desirably, the master key may be configured to include an identification number dependent on the first smart device, the slave key may be configured to include identification numbers dependent on the first smart device and the second smart device, and the lock system may receive a signal corresponding to the master key or the slave key, which includes the identification number of the first smart device or the second smart device, from the first smart device or the second smart device, and may allow access to control permissions if the received identification number corresponds to a previously registered identification number.

Desirably, (3-1) storing the slave key, which is sent in (3), in the second smart device and registering the slave key in the lock system may be further included after (3).

Advantageous Effects

According to an electronic key device, system and method capable of wirelessly controlling a lock system and sending permissions with which the lock system can be controlled, which are proposed in the present invention, the operation of the lock system is controlled by communicating therewith and the permissions with which the lock system can be controlled may be assigned to another electronic key device by communicating therewith, whereby the electronic key may be simply sent or lent over long distances through a communication network.

Also, according to the present invention, economical installation is possible by using common smart devices, user authentication is performed using a camera, a screen, a microphone, or the like, which is already installed in the smart devices, and the electronic key is created using an identification number dependent on each device, whereby problems attributable to the illegal use or duplication of an electronic key may be solved.

Furthermore, according to the present invention, using an electronic key application installed in a smart device, the operation of the lock system can be limited depending on one or more preset parameter values selected from among time, GPS coordinate values, temperature, and humidity, whereby the operation of the lock system may be limitedly controlled depending on the time, the region, the external environment, or the like, and different permissions may be assigned.

DESCRIPTION OF THE REFERENCE NUMERALS IN THE DRAWINGS

Figure 1:
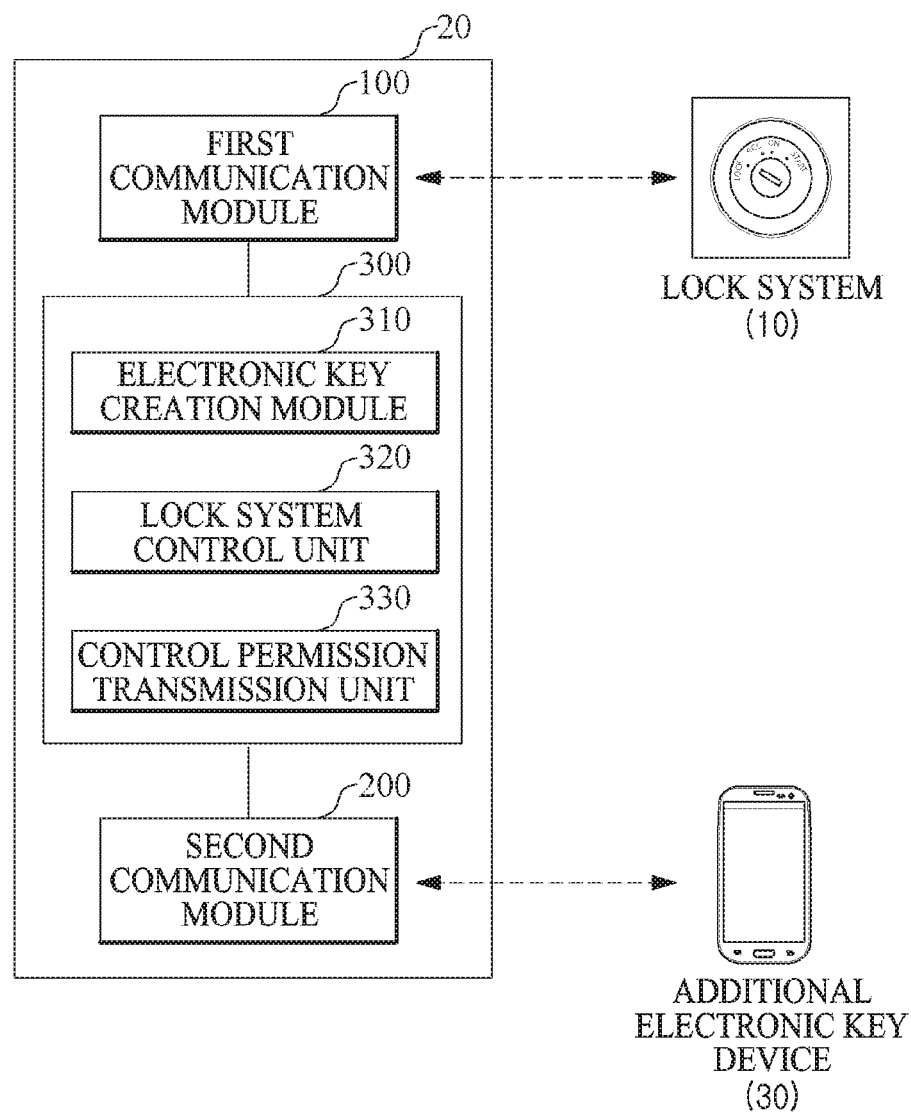
FIG. 1 is a view illustrating an electronic key device capable of wirelessly controlling a lock system and sending permissions with which the lock system can be controlled according to an embodiment of the present invention.

10: lock system
20: electronic key device (master key device)
30: electronic key device (slave key device)
100, 100': first communication module
200, 200': second communication module
300, 300': control module
310: electronic key creation unit
320: lock system control unit 330: control permission transmission unit 400: user authentication module S100: step in which a first smart device, in which an electronic key application is installed, creates a master key corresponding to a lock system S100': step in which a first smart device, in which an electronic key application is installed, creates a master key corresponding to a lock system, the master key including an identification number dependent on the first smart device S200: step in which the master key created in step S100 is stored in the first smart device and registered in the lock system S300: step in which the first smart device, in which the master key is stored, creates a slave key for controlling the operation of the lock system within a preset range and sends the slave key to a second smart device in which the electronic key application is installed, whereby the permissions with which the operation of the lock system can be controlled are assigned to the second smart device S300': step in which the first smart device, in which the master key is stored, creates a slave key for controlling the operation of the lock system within a preset range, the slave key including identification numbers dependent on the first and second smart devices, and sends the slave key to the second smart device, in which the electronic key application is installed, whereby the permissions with which the operation of the lock system can be controlled are assigned to the second smart device S310: step in which the slave key sent in step S300' is stored in the second smart device and registered in the lock system S400: step in which the first smart device or the second smart device controls the operation of the lock system by sending an operation control signal to the lock system S400': step in which the first smart device or the second smart device controls the operation of the lock system by sending an operation control signal and a signal corresponding to the master key or the slave key, which includes the identification number of the first smart device or the second smart device, to the lock system

BEST MODE

Hereinafter, preferred embodiments of the present invention are described with reference to the accompanying drawings in order to describe the present invention in detail so that those having ordinary knowledge in the technical field to which the present invention pertains can easily practice the present invention in the following description, it is to be noted that, when the functions of conventional elements and the detailed description of elements related with the present invention may make the gist of the present invention unclear, a detailed description of those elements will be omitted. Also, reference should now be made to the drawings, in which the same reference numerals are used throughout the different drawings to designate the same or similar components.

Further, throughout the entire specification, it should be understood that a representation indicating that a first component is "connected" to a second component may include the case where the first component is "indirectly connected" to the second component with some other components interposed therebetween, as well as the case where the first component is "directly connected" to the second component. Furthermore, it should be understood that a representation indicating that a first component "includes" a second component means that other components may be further included, without excluding the possibility that other components will be added, unless a description to the contrary is specifically pointed out in context.

FIG. 1 is a view illustrating an electronic key device capable of wirelessly controlling a lock system and sending permissions with which the lock system can be controlled according to an embodiment of the present invention. As illustrated in FIG. 1, an electronic key device 20 capable of wirelessly controlling a lock system and sending permissions with which the lock system can be controlled according to an embodiment of the present invention is a device for controlling the operation of a lock system 10 by communicating with the lock system 10, and may be configured to include a first communication module 100, a second communication module 200, and a control module 300.

Desirably, the electronic key device capable of wirelessly controlling a lock system and sending permissions with which the lock system can be controlled according to an embodiment of the present invention may be a smart device in which an electronic key application is installed. A smart device indicates a product configured such that the functions thereof are not limited and most of the functions may be changed or extended using applications, and a smart phone, in which applications (software) may be downloaded and installed, corresponds to the typical example of the smart device. However, without limitation thereto, any device in which an electronic key application can be installed, such as an iPad, a tablet PC, or the like, may play the role of the electronic key device of the present invention, regardless of the specific form of the terminal. However, in the present invention, because it is important to provide portability to a user in order to function as a key, it is desirable to use a smart phone, which is easily and necessarily carried by an ordinary person.

According to an embodiment, the electronic key device 20 may be a smart device in which an electronic key application for a vehicle is installed, and may wirelessly control the operation of a lock system 10 installed in the vehicle and assign permissions with which the operation of the lock system 10 can be controlled to another smart device 30. However, this is merely an embodiment, and an electronic key device other than the electronic key for a vehicle may be applied to various mechanical devices for which user permission is required, including various kinds of door locks.

The first communication module 100 serves to communicate with the lock system 10, and may use one or more selected from infrared rays, RFID, NFC, and Bluetooth. The second communication module 200 serves to communicate with an additional electronic key device 30, and may use Wi-Fi or a mobile communication network.

The control module 300 may be configured to include an electronic key creation unit 310 for creating an electronic key corresponding to the lock system 10, a lock system control unit 320 for registering the corresponding electronic key in the lock system 10 through the first communication module 100 and controlling the operation of the lock system 10 by sending an operation control signal to the lock system 10, and a control permission transmission unit 330 for assigning permissions with which the operation of the lock system 10 can be controlled to the additional electronic key device 30 through the second communication module 200.

Figure 2:
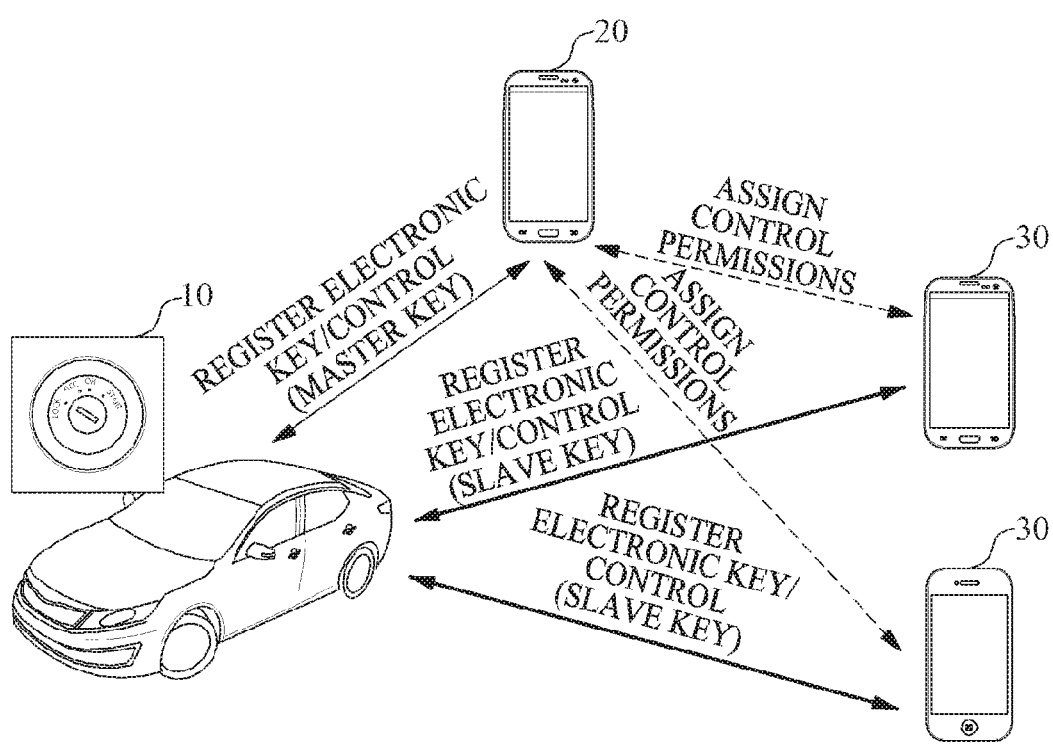
FIG. 2 is a view illustrating the process in which an electronic key device wirelessly controls a lock system and sends permissions with which the lock system can be controlled according to an embodiment of the present invention.

FIG. 2 is a view illustrating the process in which an electronic key device wirelessly controls a lock system and sends permissions with which the lock system can be controlled according to an embodiment of the present invention. As illustrated in FIG. 2, when an electronic key corresponding to a lock system 10 is created in the electronic key device 20 capable of wirelessly controlling a lock system and sending permissions with which the lock system can be controlled, proposed in the present invention, the corresponding electronic key is registered in the lock system 10 as an authorized user, and access to the lock system is permitted. Also, the electronic key device 20, containing the registered electronic key, may control the operation of the lock system 10 by wirelessly transmitting an operation control signal for the lock system 10 through the first communication module 100. Meanwhile, the electronic key device 20, proposed in the present invention, has not only the function of wirelessly controlling the lock system 10 but also the function of assigning permissions to the additional electronic key device 30 in order to permit the additional electronic key device to control the lock system within a certain range.

The method of assigning permissions with which the lock system can be controlled may be configured such that the electronic key device itself creates a new electronic key (a slave key) to be assigned to a specific electronic key device 30, using an application for setting an electronic key, and then sends the created key to the specific electronic key device 30. However, this is merely an embodiment, and the process of assigning operation control permissions may be performed through an additional service provision server. Meanwhile, when an electronic key is created and used, the creation of an encrypted ID, code extracted therefrom, and a one-time random number received from the lock system may be used. In this regard, a description will be made later with reference to FIG. 8. The present invention provides the electronic key device having the function of wirelessly transmitting permissions with which the lock system can be controlled, whereby the electronic key may be simply sent or lent over long distances through a communication network.

Figure 3:
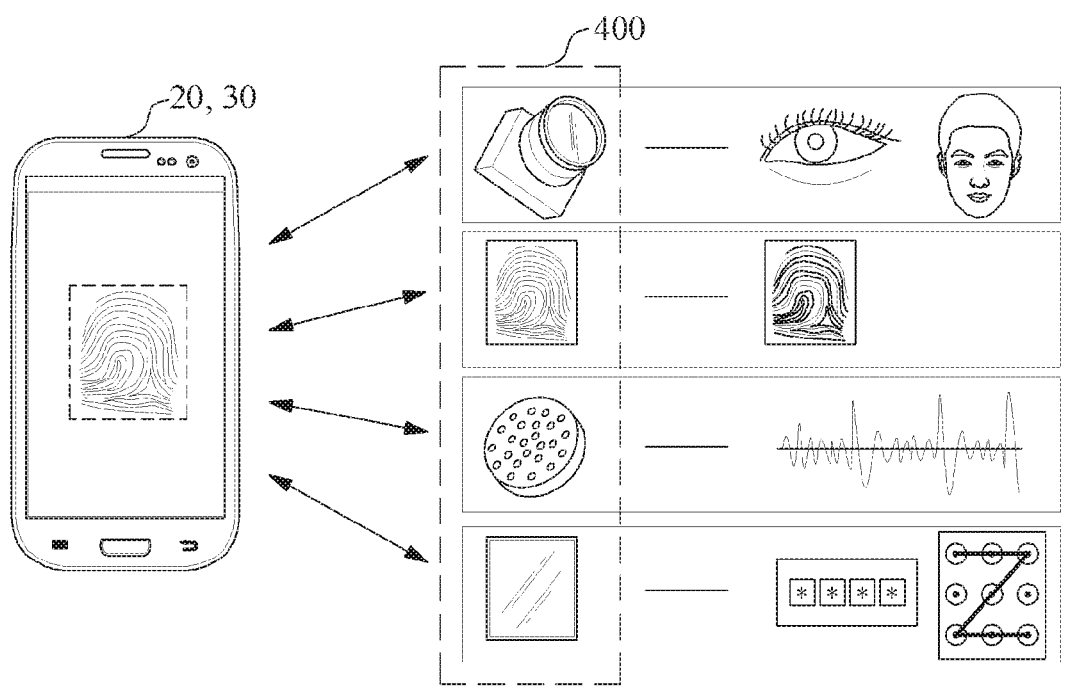
FIG. 3 is a view illustrating a user authentication module of an electronic key device capable of wirelessly controlling a lock system and sending permissions with which the lock system can be controlled according to an embodiment of the present invention.

FIG. 3 is a view illustrating the user authentication module of an electronic key device capable of wirelessly controlling a lock system and sending permissions with which the lock system can be controlled according to an embodiment of the present invention. As illustrated in FIG. 3, the electronic key device 20 capable of wirelessly controlling a lock system and sending permissions with which the lock system can be controlled according to an embodiment of the present invention may further include a user authentication module 400. Here, the user authentication module 400 serves to perform user authentication when controlling the operation of the lock system 10 or when assigning permissions with which the operation of the lock system 10 can be controlled to an additional electronic key device 30. User authentication may be performed through one or more selected from among iris recognition, face recognition, fingerprint recognition, voice recognition, the input of a password, and the input of a pattern. However, these are mere embodiments, and user authentication is not limited to these. When a smart device is used as the electronic key device 20, because the smart device is already equipped with a camera, a screen, a microphone, and the like, user authentication may be performed using these components. Because the electronic key device 20 proposed in the present invention is configured to create an encrypted electronic key in a software manner, to convert the electronic key to a signal, and to send the signal, it is advantageous in that the electronic key may be simply sent, replaced, or lent, but it is problematic that the electronic key is vulnerable to the illegal use or duplication thereof. However, the user authentication module 400 may make the electronic key be executed only by a certain user, whereby the problem in that the electronic key may be illegally used or copied may be solved.

Figure 4:
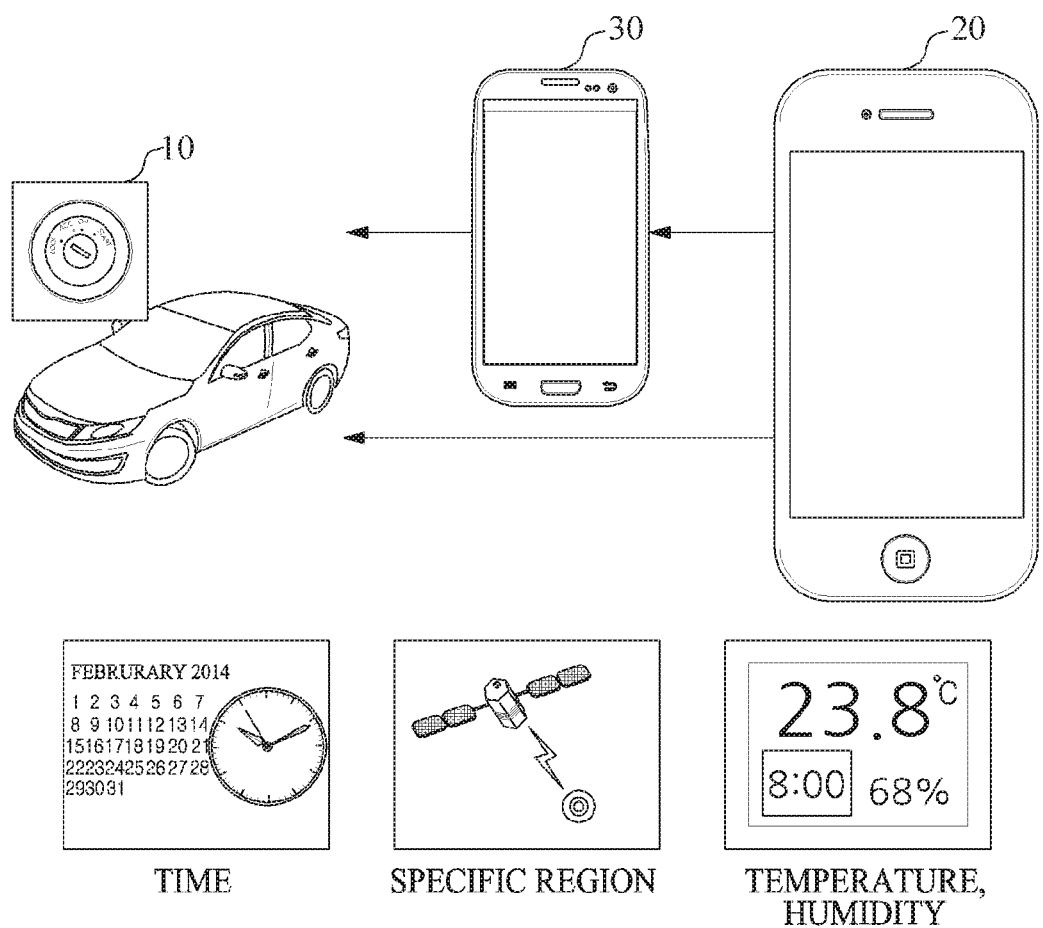
FIG. 4 is a view illustrating an example of limited control of the operation of a lock system in an electronic key device capable of wirelessly controlling the lock system and sending permissions with which the lock system can be controlled according an embodiment of the present invention.

FIG. 4 is a view illustrating an example of limited control of a lock system in an electronic key device capable of wirelessly controlling the lock system and sending permissions with which the lock system can be controlled according to an embodiment of the present invention. As illustrated in FIG. 4, an electronic key device 20 according to an embodiment of the present invention and an additional electronic key device 30, having received permissions with which the operation of the lock system 10 can be controlled from the electronic key device 20, individually control the operation of the lock system 10, but may control the operation of the lock system 10 depending on one or more preset parameter values selected from among the time, GPS coordinate values, temperature, and humidity. As described above with reference to FIG. 3, because the electronic key device 20 is vulnerable to illegal use or duplication of an electronic key, the control permissions may be limited. Specifically, control of the operation of the corresponding lock system 10 may be allowed only at a specific date, time or during a specific period, or control of the operation of the corresponding lock system 10 may be allowed in a specific region using a GPS attached to the electronic key device 20 or the lock system 10. Furthermore, the permissions may be limited depending on the external environment, such as the temperature, humidity, or the like. These limitations may be set in the electronic key device 20 in advance, or the electronic key device 20 may assign limited permissions when assigning permissions to the additional electronic key device 30. Particularly, when permissions are assigned to the additional electronic key device 30, the function of assigning limited permissions may be available in such a way that valet parking for a vehicle is permitted temporarily (with a time limitation) or that the usage of a vehicle is permitted only in a specific region or environment when the vehicle is lent to a friend.

Figure 5:
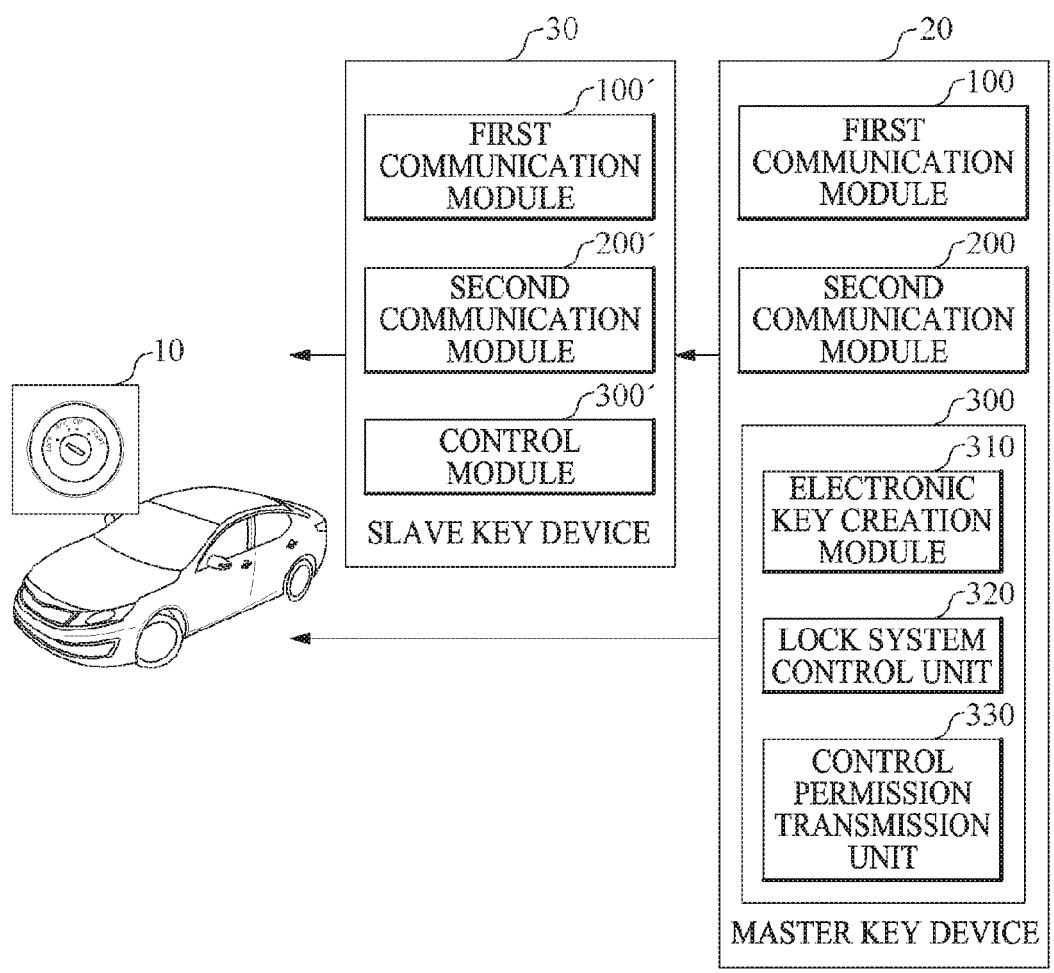
FIG. 5 is a view illustrating an electronic key system capable of wirelessly controlling a lock system and sending permissions with which the lock system can be controlled according to an embodiment of the present invention.

FIG. 5 is a view illustrating an electronic key system capable of wirelessly controlling a lock system and sending permissions with which the lock system can be controlled according to an embodiment of the present invention. As illustrated in FIG. 5, the electronic key system capable of wirelessly controlling a lock system and sending permissions with which the lock system can be controlled according to an embodiment of the present invention may be configured to include a master key device 20, for controlling the operation of the lock system 10 by communicating with the lock system 10 and for assigning permissions with which the operation of the lock system 10 can be controlled to an additional electronic key device 30 by communicating with the additional electronic key device 30, and a slave key device 30, for receiving the permissions with which the operation of the lock system 10 can be controlled from the master key device 20 and for controlling the operation of the lock system 10 within the range of the assigned permissions. The master key device 20 corresponds to the electronic key device capable of wirelessly controlling a lock system and sending permissions with which the lock system can be controlled, which is proposed in the present invention and described with reference to FIGS. 1 to 4, and the slave key device 30 corresponds to the additional electronic key device, which receives permissions with which the operation of the lock system 10 can be controlled from the electronic key device capable of wirelessly controlling the lock system and sending permissions with which the lock system can be controlled, proposed in the present invention. Each of the master key device 20 and the slave key device 30 may be a smart device in which an electronic key application is installed. The slave key device 30 may also include a first communication module 100' for communicating with the lock system 10, a second communication module 200' for communicating with the master key device 20, and a control module 300' for controlling the communication modules.

Figure 6:
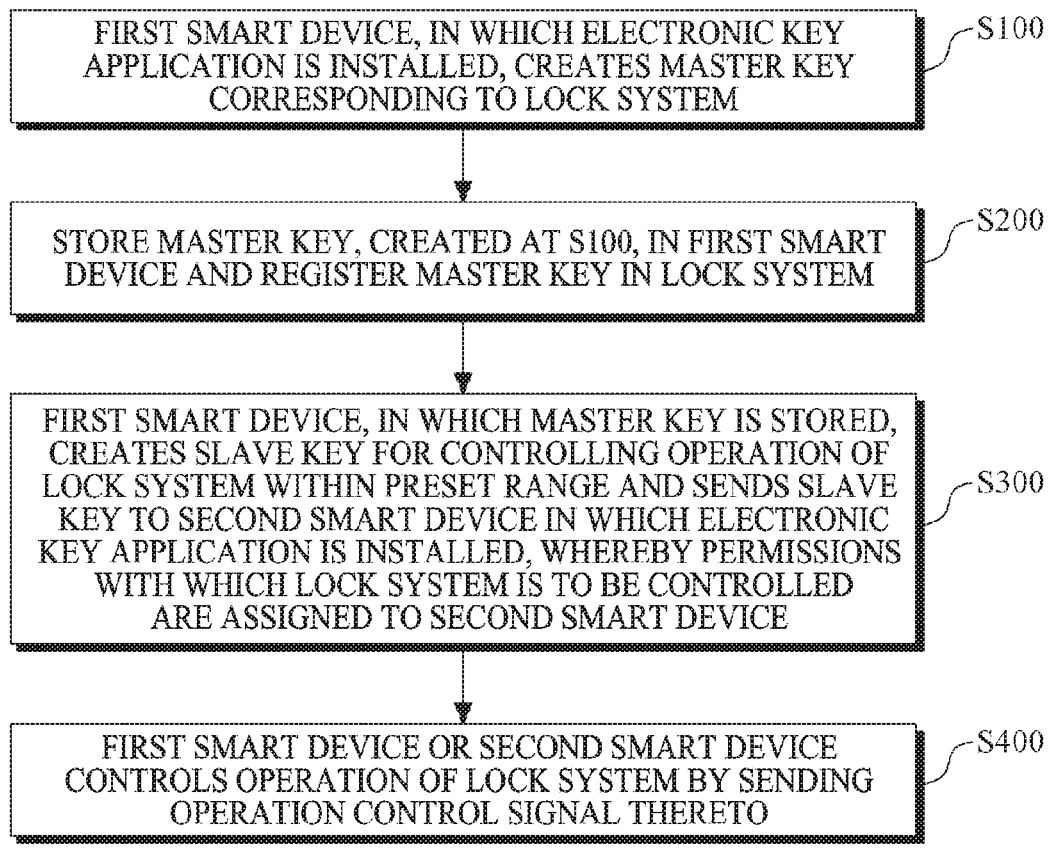
FIG. 6 is a view illustrating the flow of a method for wirelessly controlling a lock system and sending permissions with which the lock system can be controlled using an electronic key according to an embodiment of the present invention.

FIG. 6 is a view illustrating the flow of a method for wirelessly controlling a lock system and sending permissions with which the lock system can be controlled using an electronic key according to an embodiment of the present invention. As illustrated in FIG. 6, the method for wirelessly controlling a lock system and sending permissions with which the lock system can be controlled using an electronic key according to an embodiment of the present invention may be implemented to include a step (S100) in which a first smart device, in which an electronic key application is installed, creates a master key corresponding to a lock system, a step (S200) in which the master key, created in step S100, is stored in the first smart device and registered in the lock system, a step (S300) in which the first smart device, in which the master key is stored, assigns permissions with which the operation of the lock system can be controlled to a second smart device by creating a slave key for controlling the operation of the lock system within a preset range and sending the slave key to the second smart device in which the electronic key application is installed, and a step (S400) in which the first smart device or the second smart device controls the operation of the lock system by sending an operation control signal to the lock system.

Specifically, a user may read limitation conditions required for the operation of a lock system, which have been prepared in the lock system in advance, using an interactive wireless communication protocol between the first smart device and the lock system, and may input the values of limitation condition parameters, which are necessary for the lock system, through the first smart device when creating the master key. Here, the master key may be created so as to include an ID dependent on the first smart device, the input values of the limitation condition parameters, information about parameter values required to create a slave key, and user authentication information according to a security level, and the created master key is stored in the first smart device and registered in the lock system. The electronic key system may be allowed to communicate with the lock system only within short distances through encrypted near-field wireless communication (NFC, Bluetooth, infrared rays, or the like), a security check process may be set to a process using a password, a pattern, biometrics, or the like depending on a set security level, and a process for authenticating the owner of the second smart device may be performed using biometrics or the like in the second smart device as well as in the first smart device.

The slave key of the second smart device may include the ID dependent on the first smart device, the ID dependent on the second smart device, a password (and/or biometrics), and information including limitation parameter values (GPS information, creation time, expiration time, and the like). An electronic key (a master key or a slave key) may be created in the first smart device or the second smart device through authentication using a mobile phone, and the slave key may be transmitted through Wi-Fi or a mobile communication network (3G, 4G, LTE, or the like). The second smart device may comprise multiple devices, and the second smart device, having the issued slave key, may be allowed to control the lock system merely by performing a user authentication process depending on the set security level.

The lock system may be configured such that one or more near-field wireless communication modules (for NFC, Bluetooth, infrared rays, RFID, or the like) are installed therein in order to communicate with the first or second smart device, and such that an electronic circuit in the form of a module, which is only open to a user whose access to the lock system is allowed according to a security level, is included therein. The lock system itself may include a time setting function and an automatic lock function in order to allow the electronic key to control the lock system only for a certain time period. The lock system according to an embodiment of the present invention may be produced in the form of a module for a specific device or in the form of a module compatible with various kinds of devices, such as in the form of an ASIC semiconductor, a USB stick, a circuit board for a slot, or the like.

Figure 7:
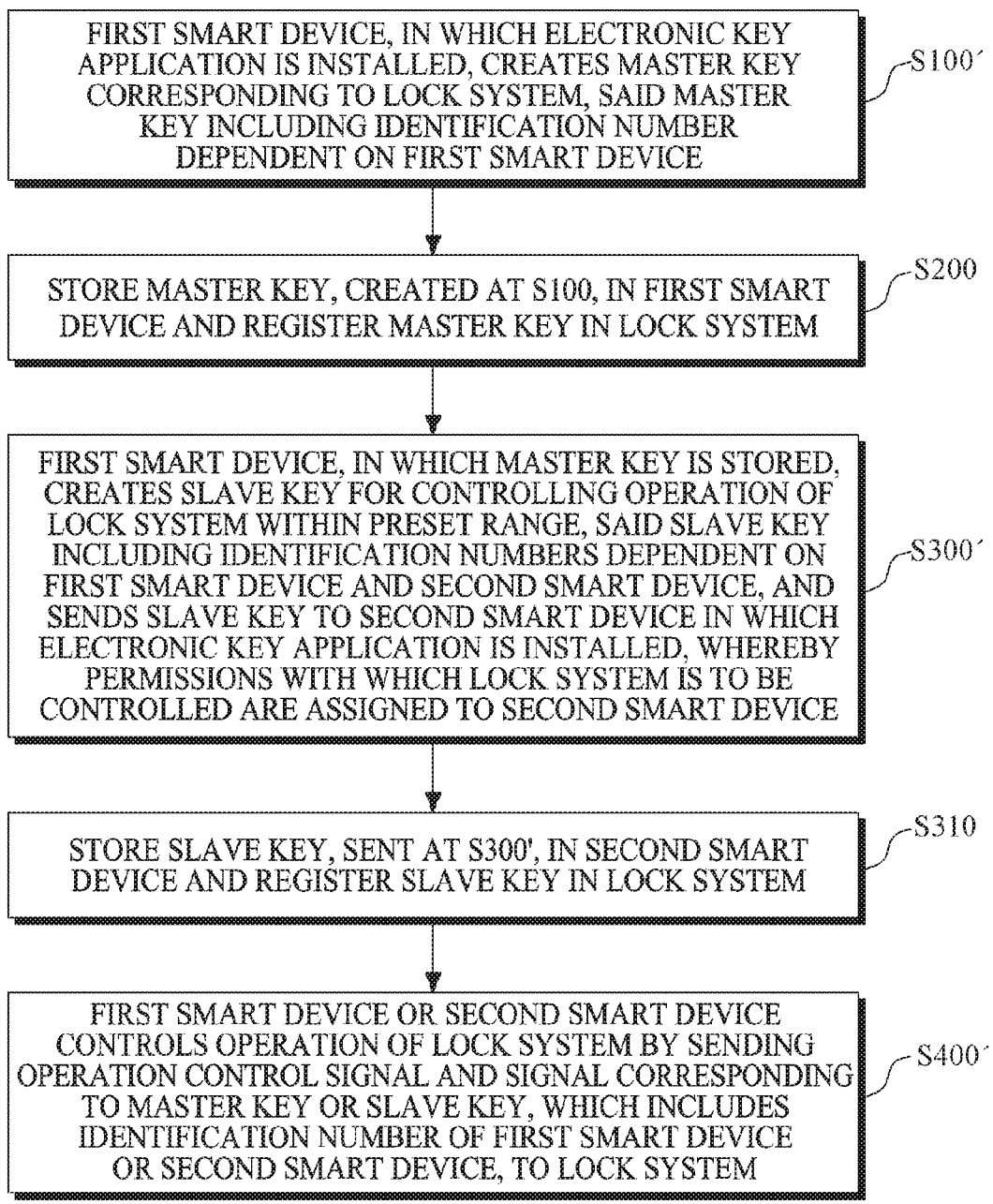
FIG. 7 is a view illustrating the flow of a method for wirelessly controlling a lock system and sending permissions with which the lock system can be controlled using an electronic key according to another embodiment of the present invention.

FIG. 7 is a view illustrating the flow of a method for wirelessly controlling a lock system and sending permissions with which the lock system can be controlled using an electronic key according to another embodiment of the present invention. As illustrated in FIG. 7, the method according to another embodiment of the present invention may be implemented to include a step (S100') in which a first smart device, in which an electronic key application is installed, creates a master key so as to correspond to a lock system and to include an identification number dependent on the first smart device, a step (S200) in which the master key created in step S100 is stored in the first smart device and registered in the lock system, a step (S300') in which the first smart device 100, in which the master key is stored, creates a slave key for controlling the operation of the lock system within a preset range, the slave key including identification numbers dependent on the first smart device and a second smart device, and sends the created slave key to the second smart device, in which the electronic key application is installed, whereby the permissions with which the operation of the lock system can be controlled are assigned to the second smart device, a step (S310) in which the sent slave key is stored in the second smart device and registered in the lock system, and a step (S400') in which the first smart device or the second smart device controls the operation of the lock system by sending an operation control signal and a signal corresponding to the master key or the slave key, which includes the identification number of the first smart device or the second smart device, to the lock system. In other words, the master key is configured to include the identification number dependent on the first smart device, the slave key is configured to include the identification numbers dependent on the first smart device and the second smart device, and the lock system receives the signal corresponding to the master key or the slave key, which includes the identification number of the first smart device or the second smart device, from the first smart device or the second smart device and may allow access to the control permissions if the received identification number matches a previously registered identification number. Also, in order to improve security, the method may be implemented such that the access permissions are open only when the second smart device is also registered in the lock system through near-field communication after step S300'.

Figure 8:
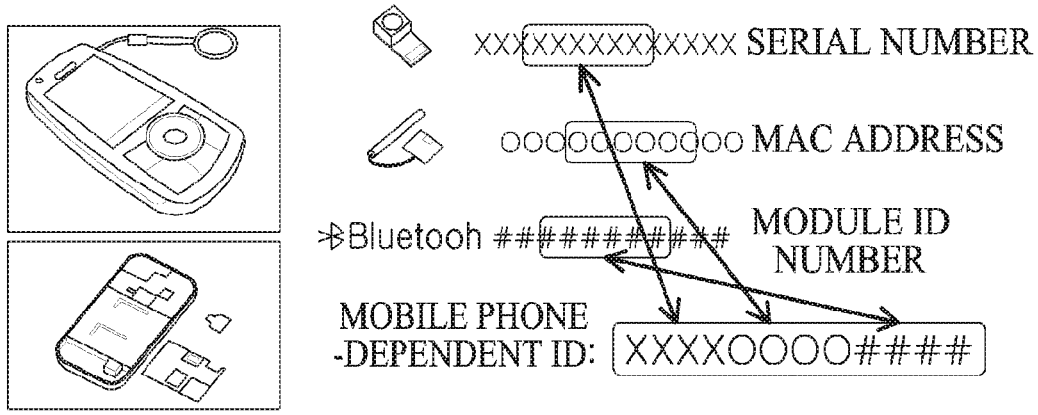
FIG. 8 is a view illustrating an example in which an electronic key is created and used in a method for wirelessly controlling a lock system and sending permissions with which the lock system can be controlled using the electronic key according to an embodiment of the present invention.

FIG. 8 is a view illustrating an example in which an electronic key is created and used in the method for wirelessly controlling lock system and sending permissions with which the lock system can be controlled using the electronic key according to an embodiment of the present invention. As illustrated in FIG. 8, the electronic key may be configured to include a single ID created only on a single device. In other words, the ID is configured to include the serial number, the MAC address, and the module ID number of the corresponding device, whereby the ID dependent on the corresponding electronic key device (the first smart device) may be created and included in the electronic key. According to an embodiment, user authentication information, parameter values, and the like may be further included, as described above. When the electronic key device (the first smart device or the second smart device) transmits an access signal to the lock system, the lock system compares the received ID of the device with a previously stored ID. If the two IDs match, the lock system permits access and control.

According to an embodiment, when the second smart device encrypts a device-dependent ID, registered in the lock system, and transmits it through near-field communication, the lock system compares the received ID with the previously stored ID. If the two IDs match, the lock system sends a single one-time random number, generated by a random number generator, to the device (the second smart device) that requests authentication through near-field wireless communication. Then, the second smart device encrypts the code, extracted from the unique device-dependent ID, using the received one-time random number, and transmits the encrypted code to the lock system in a wireless manner. Here, the extracted code may be the code acquired by extracting a certain length of digits, starting from an arbitrary location, in ascending or descending order from the device-dependent ID. The lock system checks whether the device is an authorized mobile phone using the wirelessly received code, extracted from the ID, and may receive the remaining parameter values by sending a one-time random number again. The permissions set based on the received parameter values may enable control of the lock system. The method of sending a number encrypted using a one-time random number generated by a random number generator and of using some code extracted from a device-dependent ID (that is, using a device-dependent ID as a random number table) may prevent eavesdropping on packets and illegal use thereof, whereby only an authorized device may control the lock system, thus improving security.

The above-described present invention may be variously modified or applied by those having ordinary skill in the technical field to which the present invention belongs, and the scope of the technical concept according to the present invention should be defined by the following claims.

The invention claimed is:

1. An electronic key device for controlling operation of a lock system by communicating with the lock system, the electronic key device being capable of wirelessly controlling the lock system and sending permissions with which the lock system is to be controlled, comprising:
    a first communication module for communicating with the lock system;
    a second communication module for communicating with an additional electronic key device;
    a user authentication module for performing user authentication when controlling the operation of the lock system or when assigning permissions, with which the operation of the lock system is to be controlled, to the additional electronic key device; and
    a control module for controlling the operation of the lock system through the first communication module and the second communication module,
    wherein
    the control module comprises
    an electronic key creation unit for creating an electronic key corresponding to the lock system;
    a lock system control unit for registering the corresponding electronic key in the lock system through the first communication module and controlling the operation of the lock system by sending an operation control signal for the lock system; and
    a control permission transmission unit for assigning the permissions, with which the operation of the lock system is to be controlled, to the additional electronic key device through the second communication module,
    the user authentication module authenticates the electronic key device or the additional electronic key device for the lock system based on any one of iris recognition, face recognition, fingerprint recognition, voice recognition, input of a password, and input of a pattern, provided from a first user of the electronic key device or a second user of the additional electronic key device, and
    the permissions are configured to allow the additional electronic key device to control the operation of the lock system only at a preset place during a preset period.

2. The electronic key device of claim 1, wherein
    the first communication module communicates with the lock system using one or more selected from among infrared rays, RFID, NFC, and Bluetooth, and
    the second communication module communicates with the additional electronic key device using Wi-Fi or a mobile communication network.

3. The electronic key device of claim 1, wherein the electronic key device controls the operation of the lock system depending on parameter values that include temperature and humidity.

4. The electronic key device of claim 1, wherein the electronic key device is a smart device in which an electronic key application for a vehicle is installed, and is configured to wirelessly control operation of a lock system installed in the vehicle and to assign permissions, with which the operation of the lock system is to be controlled, to another smart device.

5. An electronic key system capable of wirelessly controlling a lock system and sending permissions with which the lock system is to be controlled, comprising:
    a master key device for controlling an operation of the lock system by communicating with the lock system, assigning permissions, with which the operation of the lock system is to be controlled, to an additional electronic key device by communicating with the additional electronic key device, and performing user authentication when controlling the operation of the lock system or when assigning the permissions to the additional electronic key device; and
    a slave key device for receiving the permissions, with which the operation of the lock system is to be controlled, from the master key device and controlling the operation of the lock system within a range of the received permissions,
    wherein
    each of the master key device and the slave key device is a smart device in which an electronic key application is installed,
    the master key device authenticates the master key device or the slave key device for the lock system based on any one of iris recognition, face recognition, fingerprint recognition, voice recognition, input of a password, and input of a pattern, provided from a first user of the master key device or a second user of the slave key device, and the permissions assigned to the slave key device allow control of the operation of the lock system only at a preset place during a preset period.

6. A method for wirelessly controlling a lock system and sending permissions with which the lock system is to be controlled using an electronic key, comprising:
  (1) creating, by a first smart device in which an electronic key application is installed, a master key corresponding to the lock system;
  (2) storing the master key created at (1) in the first smart device and registering the master key in the lock system;
  (3) assigning permissions with which the operation of the lock system is to be controlled to a second smart device in such a way that the first smart device, in which the master key is stored, creates a slave key for controlling the operation of the lock system within a preset range and sends the slave key to the second smart device in which the electronic key application is installed; and
  (4) sending, by the first smart device or the second smart device, an operation control signal to the lock system and thereby controlling the operation of the lock system,
wherein in (3), the preset range indicates a preset period and a preset place, and in (4), the first smart device or the second smart device is authenticated by the lock system based on any one of iris recognition, face recognition, fingerprint recognition, voice recognition, input of a password, and input of a pattern, provided from a first user of the first smart device or a second user of the second smart device, and then sends the operation control signal to the lock system.

7. The method of claim 6, wherein
the master key is configured to include an identification number dependent on the first smart device,
the slave key is configured to include identification numbers dependent on the first smart device and the second smart device, and
the lock system receives a signal corresponding to the master key or the slave key, which includes the identification number of the first smart device or the second smart device, from the first smart device or the second smart device, and allows access to control permissions if the received identification number corresponds to a previously registered identification number.

8. The method of claim 6, further comprising, after (3)
  (3-1) storing the slave key, which is sent in (3), in the second smart device and registering the slave key in the lock system.

* * * * *